(12) United States Patent
Wu et al.

(10) Patent No.: US 8,725,847 B2
(45) Date of Patent: May 13, 2014

(54) ASYNCHRONOUS INVOCATION OF WEB SERVICES USING MOBILE CLIENT APPLICATIONS

(75) Inventors: Huaigu Wu, Brossard (CA); Louenas Hamdi, Quebec (CA); Andreas Goeb, Griesheim (DE); Daniel Koelsch, Montreal (CA); Stephane Ris, Montreal (CA)

(73) Assignee: SAP AG, Walldorf (DE)

( * ) Notice: Subject to any disclaimer, the term of this patent is extended or adjusted under 35 U.S.C. 154(b) by 381 days.

(21) Appl. No.: 12/564,238

(22) Filed: Sep. 22, 2009

(65) Prior Publication Data

US 2011/0072070 A1 Mar. 24, 2011

(51) Int. Cl.
*G06F 15/177* (2006.01)
*G06F 15/16* (2006.01)

(52) U.S. Cl.
USPC .................... 709/220; 709/203; 709/228

(58) Field of Classification Search
USPC ........................... 709/236, 246, 203
See application file for complete search history.

(56) References Cited

U.S. PATENT DOCUMENTS

| | | | | |
|---|---|---|---|---|
| 6,083,276 A * | 7/2000 | Davidson et al. | | 717/107 |
| 7,506,259 B1 * | 3/2009 | Narayanaswami et al. | | 715/734 |
| 7,665,094 B2 * | 2/2010 | Frender et al. | | 719/310 |
| 7,752,292 B1 * | 7/2010 | Katzer | | 709/222 |
| 7,941,784 B2 * | 5/2011 | Shenfield et al. | | 717/107 |
| 7,992,127 B2 * | 8/2011 | Loupia et al. | | 717/106 |
| 2006/0023674 A1 * | 2/2006 | Goring et al. | | 370/338 |
| 2009/0216840 A1 * | 8/2009 | Pajunen et al. | | 709/206 |

OTHER PUBLICATIONS

E. Sánchez-Nielsen et al., "Mobile and Dynamic Web Services," *Emerging Web Services Technology: Whitestein Series in Software Agent Technologies and Autonomic Computing*, Oct. 2007, 16 pages.
NetBeans IDE 6.8 Features [retrieved May 25, 2010] http://netbeans.org/features/javame/index.html.
BlackBerry MDS Studio [retrieved May 25, 2010], hitp://na.blackberry.com/eng/developers/rapidappdev/mdsstudio.jsp.

* cited by examiner

*Primary Examiner* — Richard G Keehn
(74) *Attorney, Agent, or Firm* — Fish & Richardson P.C.

(57) ABSTRACT

Implementations of the present disclosure provide methods of invoking a web service using a mobile client. In some implementations, a method includes defining a correlation between a plurality of input components of an application that is executed on the mobile client and a plurality of parameters of a web service application, generating a text file based on the correlation, storing the text file in memory of the mobile client, generating an invocation message at the mobile client based on the text file and a user input, and transmitting the invocation message to a server to invoke the web service application.

21 Claims, 8 Drawing Sheets

US 8,725,847 B2

ASYNCHRONOUS INVOCATION OF WEB SERVICES USING MOBILE CLIENT APPLICATIONS

BACKGROUND

As mobile technologies develop, a number of new web services can be provided to mobile device users. Web services can be developed and provided to mobile devices using various techniques. For example, a developer can employ a development environment (e.g., NetBeans IDE) which can provide a number of wizards to create mobile client applications for consuming web services. In another example, a developer can generate and deploy Simple Object Access Protocol (SOAP) messages to access one or more web services.

Mobile application developers can use invocation codes to link mobile clients to web services. Service invocation codes typically define how to map client/server input and output data to web service response data. Specifically, the service invocation codes may refer to both mapping client side inputs to input parameters of operations of web services, and mapping responses of operations of web services to client side outputs.

SUMMARY

Implementations of the present disclosure provide computer-implemented methods of asynchronously invoking web services. In some implementations, a method includes receiving a correlation between a plurality of input components of an application that is executed on the mobile client and a plurality of parameters of a web service application, generating a text file based on the correlation, storing the text file in memory of the mobile client, generating an invocation message at the mobile client based on the text file and a user input, and transmitting the invocation message to a server to invoke the web service application.

In some implementations, the method further includes receiving a response message from the server at the mobile client, and generating an output to a user at the mobile client based on the response message and the text file.

In some implementations, the method further includes storing the text file in memory of the server, receiving the invocation message at the server, and generating a protocol message at the server based on the invocation message and the text file, the web service application being invoked based on the protocol message.

In some implementations, the method further includes storing the text file in memory of the server, receiving a protocol message at the server, the protocol message having been generated by the web service application, generating a response message at the server based on the protocol message and the text file, and transmitting the response message to the mobile client.

In some implementations, the method further includes executing a parser on the mobile client, and processing the user input using the parser, the parser accessing the text file and generating the invocation message.

In some implementations, the method further includes storing the text file in memory of the server, executing a parser on the server, and processing the invocation message using the parser, the parser accessing the text file and generating a protocol message to invoke the web service application.

In some implementations, the method further includes modifying the correlation between the plurality of input components and the plurality of parameters, generating a revised text file based on the correlation, and storing the revised text file in memory of the mobile client, wherein a subsequent invocation message is generated at the mobile client based on the revised text file and a user input.

Implementations of the present disclosure further provide a computer-readable storage medium coupled to one or more processors and having instructions stored thereon which, when executed by the one or more processors, cause the one or more processors to perform operations in accordance with implementations of the methods provided herein.

Implementations of the present disclosure also provide a system including a mobile client and a server. The mobile client and the server are operable to perform operations in accordance with implementations of the methods provided herein.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
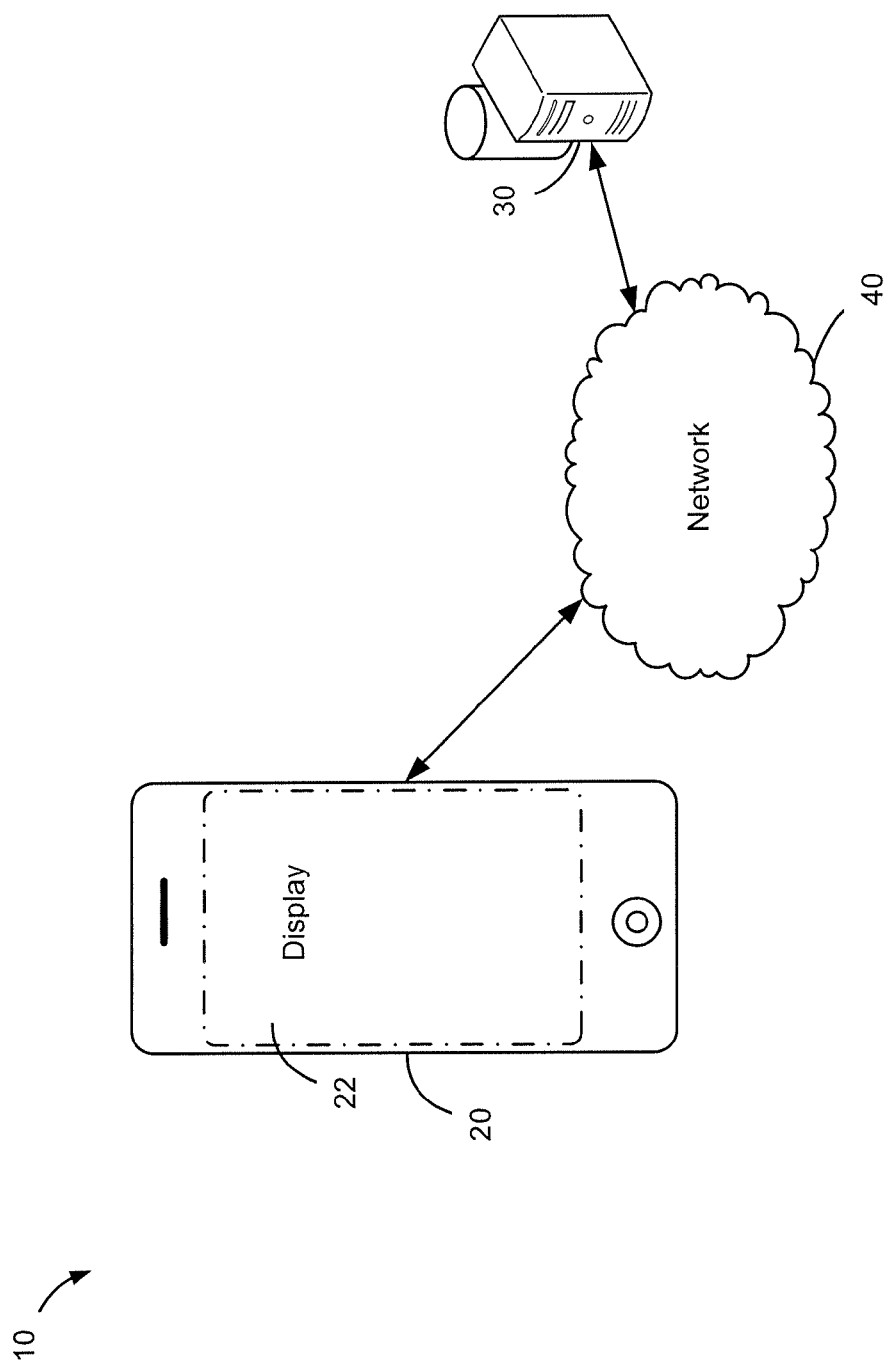
FIG. 1 is a schematic illustration of an exemplar network architecture in accordance with implementations of the present disclosure.

Referring now to FIG. 1, a schematic illustration of an exemplar network architecture 10 is provided. The architecture 10 can, for example, manage the deployment of web services on one or more mobile clients 20 or other computing devices. Managing the deployment of web services may include facilitating mobile client applications to asynchronously invoke web services on one or more mobile client devices. The architecture 10 can employ structure to define correlations between a number of input components of an application executed on a mobile client 20, for example, and one or more parameters of a web service application running on a server 30.

At a high level, the architecture 10 may represent a distributed client/server system supporting multiple computer systems and/or mobile clients 20, and/or one or more servers 30 that are connectively coupled for communication with one another over a network 40. In some implementations, the architecture 10 may store some data at a relatively central location (e.g., accessible over a WAN), while concurrently maintaining local data on mobile client 20 for redundancy and to allow processing during downtime. In other implementations, architecture 10 may be in a dedicated enterprise environment—across a local area network (over LAN) or subnet—or any other suitable environment without departing from the scope of the present disclosure.

The mobile client 20 is intended to represent various forms of processing devices including, but not limited to, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

The mobile client device 20 can include processors, memory, input/output devices such as a display 22, communication interfaces, and transceivers, among other components. For example, the mobile client device 20 can be provided with a keyboard, touch-screen and/or stylus to enable user input to the device. The device 20 may also be provided with a storage device, such as a microdrive or other device, to provide additional storage. Components within device 20 are generally interconnected using various buses, and several of the components may be mounted on a common motherboard or in other manners as appropriate.

Processors (not shown) in mobile client 20 can process instructions for execution within the mobile client 20, including instructions stored in memory. The processors may also include separate analog and digital processors. The processors may provide, for example, for coordination of the other components of the device 20, such as control of user interfaces, applications run by device 20, and wireless communication by device 20.

Processors may communicate with a user through a control interface and display interface coupled to a display 22. The display 22 may be, for example, a TFT LCD display or an OLED display, or other appropriate display technology. The display interface may include appropriate circuitry for driving the display 22 to present graphical and other information to a user.

The mobile client device 20 can present one or more graphical user interfaces on the display 22. The graphical user interfaces provide the user access to various system objects and convey information to the user. In some implementations, the graphical user interface can include one or more selectable entities. Example selectable entities may include device functions, applications, windows, files, alerts, events, or other selectable entities.

The display 22 can implement liquid crystal display (LCD) technology, light emitting polymer display (LPD) technology, or some other display technology. The display 22 can be sensitive to haptic and/or tactile contact with a user. In some implementations, the display 22 can include a multi-touch-sensitive display. The multi-touch-sensitive display 22 can, for example, process multiple simultaneous touch points, including processing data related to the pressure, degree, and/or position of each touch point. Such processing facilitates gestures and interactions with multiple fingers, chording, and other interactions.

The mobile client device 20 may include memory (not shown) for storing information within the mobile client 20. In some implementations, memory is a computer-readable storage medium. In some implementations, the memory is a volatile memory unit or units. In another implementation, the memory is a non-volatile memory unit or units. Expansion memory may also be provided and connected to device 20 through an expansion interface, which may include, for example, a SIMM card interface. Such expansion memory 20 may provide extra storage space for device 20, or may also store applications or other information for device 20.

The mobile client device 20 may communicate wirelessly through a communication interface (not shown), which may include digital signal processing circuitry where necessary. The communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver (not shown). In addition, short-range communication may occur, such as using a Bluetooth, WiFi, or other such transceiver.

The mobile client 20 can include one or more input/output (I/O) devices and/or sensor devices. For example, a speaker and a microphone can be included to facilitate voice-enabled functionalities, such as phone and voice mail functions. In some implementations, the mobile client 20 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile client 20 or provided as a separate device that can be coupled to the mobile client 20 through an interface to provide access to location-based services.

The server 30 is intended to represent various forms of servers including, but not limited to a web server, an application server, a proxy server, a network server, a server farm. In general, the server 30 accepts user requests for web services and provides those services to any number of user devices over network 40. In some implementations, the server 30 can provide a central point through which service-providers can manage and access data related to web services. The network 40 can be provided as a large computer network, such as a local area network (LAN), wide area network (WAN), the Internet, a cellular network, or a combination thereof connecting any number of mobile clients 20 and servers 30.

Figure 2:
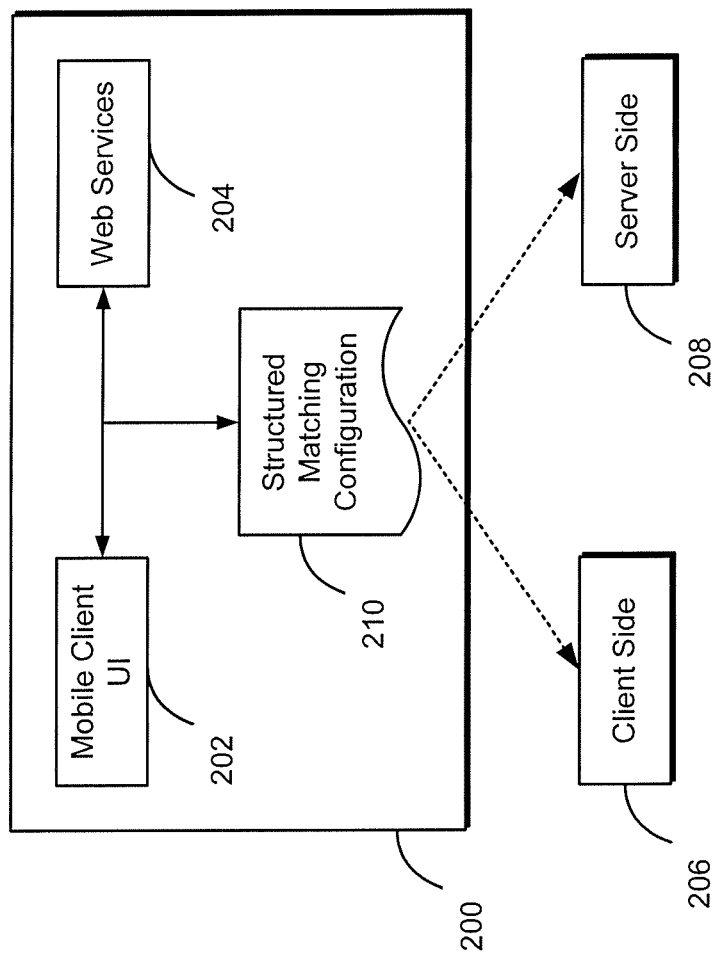
FIG. 2 is a functional block diagram illustrating an exemplar design-time environment in accordance with implementations of the present disclosure.

FIG. 2 illustrates an exemplar design-time environment 200 in accordance with implementations of the present disclosure. The environment 200 can be used to optimize invocation of web services using a mobile client device. For example, a developer can use environment 200 to optimize the development of mobile web service clients using structured text and/or text files. In particular, a developer can use structured text to define correlations between any number of input components of an application executed on a mobile client user interface and a number of parameters of a web service application. For example, a developer can use the design-time environment 200 to define correlations between a mobile client user interface 202 and web services 204 at design time. In some implementations, the environment 200 can support the use of structured text and/or text files to define a correlation between input components of mobile client applications and parameters of web service operations (e.g., input matching), and to define a correlation between responses of web service operations and output components of mobile client applications (e.g., output matching). Input and output matching is discussed in detail below with reference to FIG. 3.

Typically, when a developer begins to build a client user interface, such as mobile client user interface 202, the developer inserts one or more input components including, but not limited to an input field, a radio box, a dropdown list, buttons, icons, hyperlinks and/or combinations of the above components. The input components accept input values of users for purposes of assigning values to parameters of a target operation within the web service 204, for example. Each possible input in an input field is assigned a value. The value represents data and/or a basic data type, such as string, a symbol, or a numeric value.

In some implementations, input values may not directly correlate to a parameter of a web service operation when, for example, the operation includes a complex data structure. In this example, the input value is instead correlated to internal leaf elements of one or more parameters that also have a basic data type. A leaf element represents a data element that does not have any element children that are descendants of (or the same as) the root. Leaf elements may have attributes, and may contain text, processing instructions, and/or comments.

In some implementations, the input component correlation is represented in text, such as structured text in a text file. For example, a structured text file may be a text-based representation of an input component and the text in the text file may function as the unique name of the component. In some implementations, the correlation is represented in equation format. The equation may depict a relationship between an input component and a leaf element of a parameter.

Upon determining a correlation between components and parameters, each correlation is collected and stored in a structured matching configuration file 210. The structure matching configuration file 210 functions as a map for correlating input fields to parameters of a web service. The structured matching configuration file 210 may be saved in a text file, in some implementations. For example, the environment 200 can generate a text file (e.g., the structured matching configuration file 210) based on a one or more determined correlations and can store the text file in memory on the mobile client 20. The text file 210 can be updated accordingly if changes occur to backend web services or changes occur to a mobile client, for example. In some implementations, a developer can create a correlation at design time which defines the contents of a particular text file. The preconfigured text file may define how the server side 208 matches a particular web service. This preconfigured text file can be stored in the environment 200 for future usage.

In some implementations, the structured matching configuration file 210 can function as a dictionary of definitions for use in future web service transactions. The dictionary can be used to match other client input/output and web service input/output on both a client side 206 and a server side 208. The environment 200 can also employ the dictionary to match and/or correlate client input information to client output information and match communication messages and simple object access protocol (SOAP) messages. In some implementations, the use of a dictionary may reduce redundant message conversions in the system and allow environment 200 to parse requests at runtime.

Figure 3:
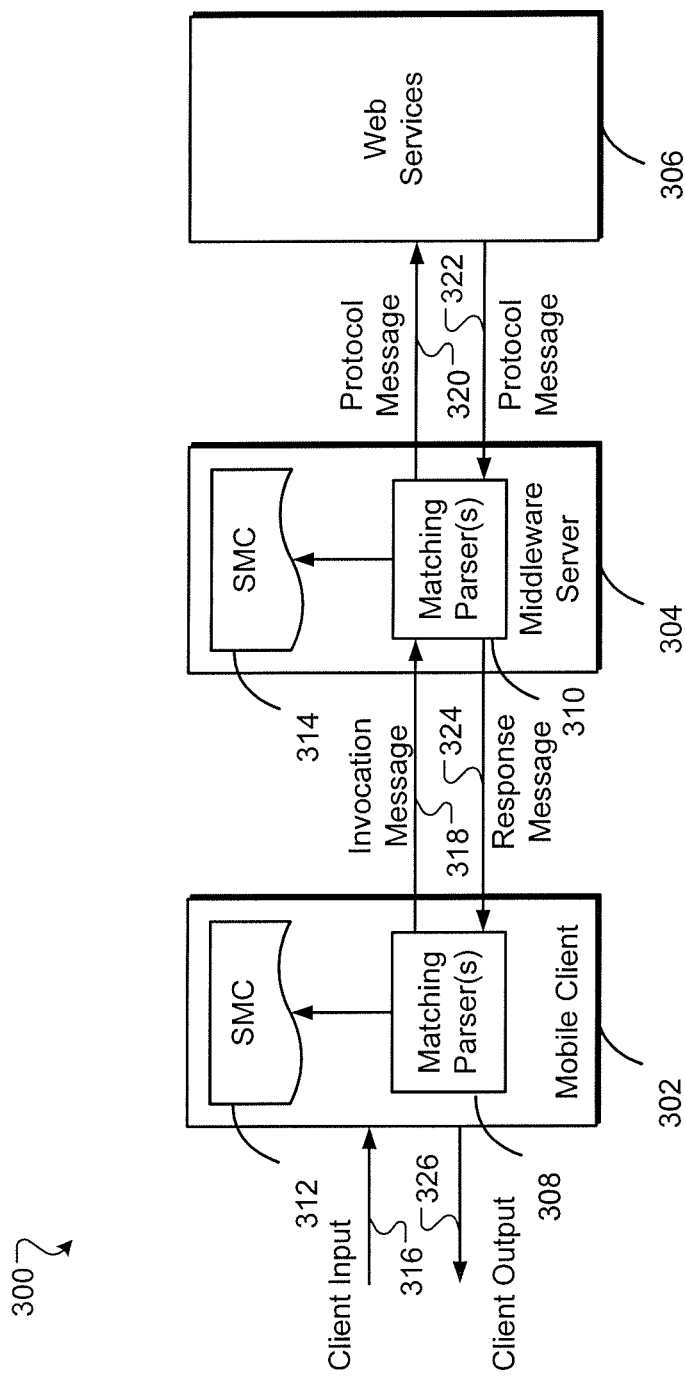
FIG. 3 is a functional block diagram of an exemplar runtime architecture in accordance with implementations of the present disclosure.

FIG. 3 is a functional block diagram of an exemplar runtime architecture 300 in accordance with implementations of the present disclosure. The architecture 300 includes a mobile client device 302, a middleware server 304, and web services 306 in communication via a network, such as the Internet. The mobile client device 302 is operable to execute an application that includes one or more input components. Further, the mobile client device 302 can store text files in memory, generate invocation messages based on the text files and received user input, and transmit invocation messages to the middleware server 304 to invoke web service applications. In some implementations, the mobile client device 302 represents the client side device 206 as shown in FIG. 2.

The mobile client 302 includes an input/output matching parser 308, which can be provided as a single parser or multiple parsers. The matching parser 308 is executed on the mobile client 302. The parser 308 can process user input, access text files, generate invocation messages, and process response messages. For example, the client side input matching parser 308 can directly convert client input information based on the pre-defined matching between input values and input parameters of the web service operations. This can be achieved by using the input matching to remove information about input components. Such an implementation can occur when a user submits an invocation to a web service operation from the mobile client 302, for example.

The middleware server 304 is operable to invoke web service applications based on invocation messages received from the mobile client device 302. The middleware server 304 can, for example, be a proxy server that is part of the server 30. In some implementations, the middleware server is located in the web server or other external location. In some implementations, the middleware server 304 represents the server side device 208 as shown in FIG. 2.

The middleware server 304 includes an input/output matching parser 310, which can be provided as a single parser or multiple parsers. The matching parser 310 stores text files in a memory on the middleware server 304, executes on the server 304, and process invocation messages by accessing text files and generating protocol messages to invoke web service applications. For example, when the middleware server 304 receives invocation messages, it does not convert the message back to client input information, but instead employs the server side input matching parser 310 to convert the message to a SOAP message, for example, by directly obtaining input values of parameters from the invocation message. In this fashion, redundant parsing of client input information is avoided, because the input matching deployed on both the server side and the client side build an intermediate matching between client input components and web service input parameters.

Both the mobile client 302 and the middleware server 304 include respective copies of structured matching configuration (SMC) files (e.g., SMC text file 312 and SMC text file 314, respectively). For example, a copy of the SMC file 210 may be stored in one or both of client 302 and server 304. In some implementations, the SMC text file 312 and SMC text file 314 are identical. In other implementations, slight changes can be made to one or both files 312 and 314 independently of one another.

In general, the system 300 can deploy web service data (e.g., in the form of SMC text files 312 and 314) on both the client and the server using structured text files without accessing web service invocation codes. As an advantage, the system 300 can skip compiling steps typically required when using web service invocation codes. This advantage also ensures that the system 300 continues processing messages and service requests without having to halt systems, apply changes, and restart applications, for example.

The web services 306 represents one or more servers or databases that store web service profiles used for the interoperability of web services on client devices. The profiles may include core specifications (e.g., SOAP, WSDL, REST, etc.) as well as specific versions and rules for the core specifications. For example, the web services 306 may store requirements to restrict the user of cores specifications. Example web service styles include Remote Procedure Calls (RPC), Service Oriented Architecture (SOA), Representational State Transfer (REST), or other proprietary or generic message style. Other web service types and styles are possible.

With continued reference to FIG. 3, the system 300 generates and transmits data content and messages between the mobile client 302, the middleware server 304, and the web services 306. In effect, the messaging facilitates homogeneous communications between the mobile client 302 and one or more backend servers. In addition, the system 300 is capacitated to correlate client input/output data and web service input/output data on both the mobile client side and the backend server side. The correlation processes may generate definition data for future correlation processes between client input/output data and the correlation processes between communication messages and SOAP messages.

The definition data defines a structured format of communication messages. The format can be mapped to client input/output on the mobile client 302 and input/output of SOAP messages on the middleware server 304. Consequently, on the client side, a communication message could be converted to a client input/output without referring to service definition, and on the server side. A communication message could be converted to a SOAP message without referring to client input/output. As a result, the definition data reduces redundant message conversions and parsing at runtime.

The mobile client 302 receives client input, as shown by arrow 316. The client input can include data content and other user input. For example, client input may include data content entered into an application text box and a submission keystroke submitting the data content in an application. The mobile client 302 receives client input and employs the matching parser 308 to determine appropriate mapping between the input and operation parameters. For example, the matching parser 308 interprets a received input value when a user provides data in a particular input field. The input field is tied to a known parameter and operation. Accordingly, the matching parser 308 maps the client input to the appropriate parameter and operation correlated to the input field that received the client input. In addition, the client input invokes the matching parser 308 to convert the client input information to a correlation between input values and input parameters of the web service operations by using the input matching and SMC text file 314 to remove information about input components. Upon performing the parsing, the mobile client 302 generates an invocation message as shown by arrow 318 and submits the invocation message to the middleware server 304.

The middleware server 304 receives the invocation message and understands the message without converting the message back to the client input data state. The middleware server 304 understands the invocation message, because the server 304 is aware of the underlying structure tying input fields to entered client input. As such, rather than reverting to the original client data, the middleware server 304 accesses SMC text file 314, using matching parser, 310 to employ the structure to the incoming message and generate messages in the structure's format. The middleware server 304 uses the invocation message to generate a protocol message on the server 304 where the protocol message is based on the invocation message and the text file SMC text file, as shown by arrow 320. In general, the middleware server 304 generates a protocol message, such as a SOAP message, for example, and directly transfers the protocol message to the web service 306 without communicating back to the mobile client 302. The middleware server 304 invokes a web service application in web services 306 based on the protocol message.

Web services 306 respond to the protocol message by sending a protocol response, as shown by arrow 322. In general, the response of the invocation is processed in the reverse order as the above flow from the mobile client 302 to the web services 306. The response process typically employs the output matching parses in both parsers 308 and 310. In a similar fashion to the input case above, redundant parsing of client output information can also be avoided.

The middleware server 304 receives the protocol message generated by the a web service application (in web services 306). The middleware server 304 can use the protocol message contents and the SMC text file 314 to generate a response message, as shown by arrow 324. The response message is then transmitted to the mobile client 302.

The mobile client 302 receives the response message from the middleware server 304 and generates an output to a user at the mobile client 302 based on the response message and the text file 312. The mobile client 302 can respond to the original client input with client output, as shown by arrow 326. The client output may be a response to the client input including but not limited to messages, text, files, web service, email, phone call, or other requested output. In some implementations, the client output simply invokes a requested web service application based on the invocation message received form the mobile client 302.

Similar to the structure matching configuration file 210, the text files 312 and 314 can represent a map for correlating input fields to parameters of a web service. In some implementations, stored SMC text files 312, 314 may be modified if, for example, updates to particular web services are received. For example, if a new correlation between an input component and a parameter is received at the server, a modification can be made to the correlation in an existing text file. In particular, the system 300 can generate a revised text file based on any or all determined correlations between a plurality of input components and a plurality of parameters. The revised text file is then stored in memory on the mobile client 302. At this point, a subsequent invocation message is generated at the mobile client 302 based on the revised text file and a user input. For example, the revised text file can be redeployed on both the client side 302 and the server side 304. Here, the redeployment is simply an update to existing text files and thus, a recompilation is unnecessary. As such, the risk of recompilation and redeployment of program codes is reduced thereby simplifying maintenance of the system 300.

Figure 4B:
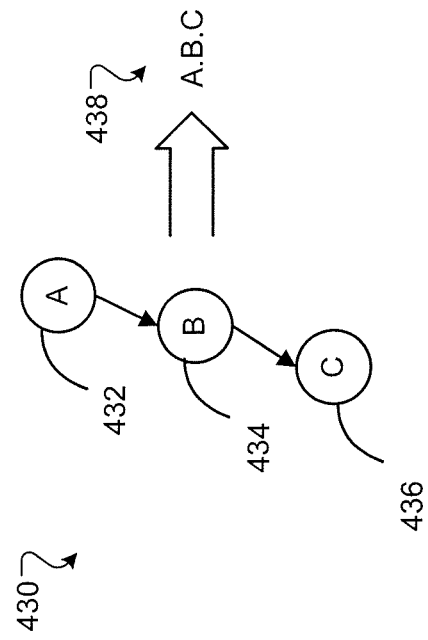
FIG. 4B illustrates an exemplar text-based representation of a leaf element of a parameter in accordance with implementations of the present disclosure.
Figure 4A:
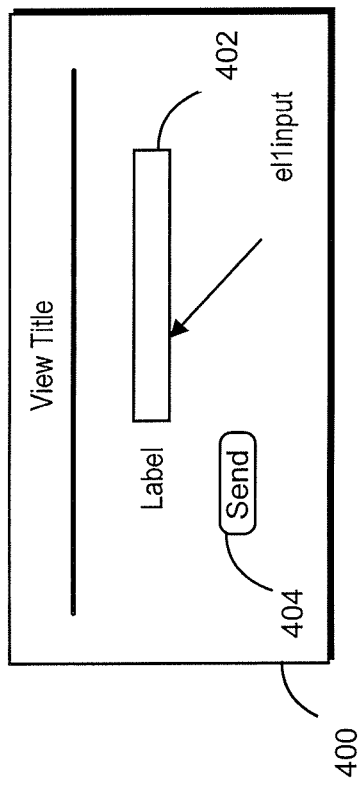
FIG. 4A illustrates an exemplar text-based representation of an input field in accordance with implementations of the present disclosure.

Referring to FIG. 4A, a screen shot 400 of an exemplar text-based application is depicted. The screenshot 400 is an example of a mobile client user interface 202 (FIG. 2). The screen shot 400 includes a "label" input field 402 and a send input button 404. Each input field 402 can represent a leaf element of one or more parameters. For example, the input field 402 is represented by its name "el1input," which is built based on the "XPath" of this particular type of input element. In this example, a mobile client user can input a value into the "label" input filed 402 and select the send input button 404. Selection of the input button 404 causes an underlying application to take action with respect to the inputted data.

Referring to FIG. 4B, an exemplar text-based representation 430 depicts a leaf element of a parameter. Here, the representation 430 includes a parameter of a web service operation (A) 432 and two leaf elements (B) 434 and (C) 436 of the parameter (A) 432. In particular (C) 436 represents a leaf element of (A) 432. The text-based representation of (C) 436 is shown in text notation as "A.B.C." 438. By way of non-limiting example, a correlation can be made between the input field "el1input" 402 and the text notation "A.B.C." 438 by using the equation "value [A.B.C]=el1input" to represent a matched input and output. The equation implies that the value of the element (C) 436 is input from the input field "el1input" 402. In some implementations, the concrete format of the equation is described in a different notation depending upon the implementation. An output correlation between output components of a client user interface and responses of web service operations can be built in the similar way.

Figure 5A:
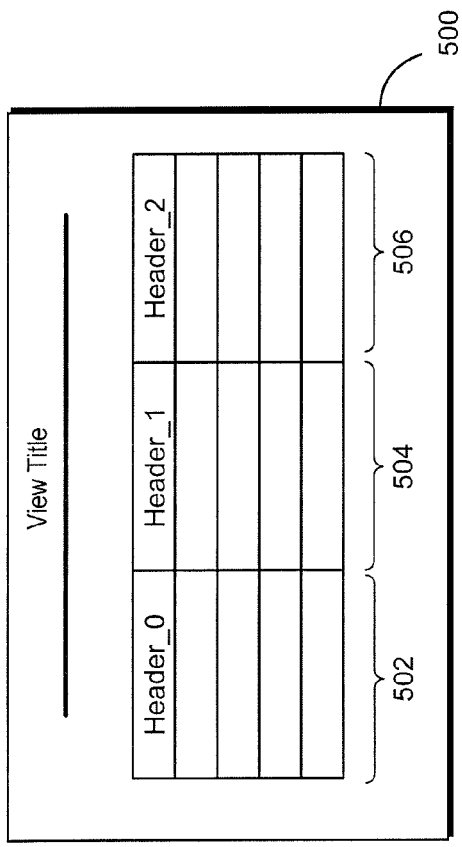
FIG. 5A illustrates an exemplar table illustrating a web service response in accordance with implementations of the present disclosure.

FIG. 5A illustrates an exemplar table 500 illustrating a web service response in accordance with implementations of the present disclosure. In general, a response of a web service operation may contain an array of values that have a complex data structure. A corresponding output component may include a collection component, such as the table 500 or a list, for example. The table 500 includes a "Header_0" column 502, a "Header_1" column 504, and a "Header_2" column 506. Each column 502-506 correlates to a leaf element of a complex data structure of a response.

Figure 5B:
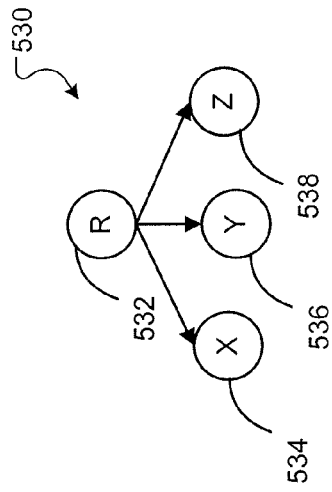
FIG. 5B illustrates an exemplar data structure of a web service response in accordance with implementations of the present disclosure.

FIG. 5B illustrates an exemplar data structure 530 of a web service response in accordance with implementations of the present disclosure. The response is represented by value (R) 532. As shown in this example, the value (R) 532 includes three leaf elements (X) 534, (Y) 536, and (Z) 538. The correlation between the value (R) 532 and the leaf elements (X) 534, (Y) 536, and (Z) 538 can be formatted into an array representing table 500, for example. One example format is represented by the following array: [Table 500: {id:column1', name:'Header_0', data:'R.X'}, {id:'column2', name: 'Header_1', data: 'R.Y'}, {id: 'column3', name: 'Header_2', data: 'R.Z'}]. The array structure implies that the first column 502 correlates to (R)'s leaf element (X) 534, the second column 504 correlates to (R)'s leaf element (Y) 536, and the third column 506 matches (R)'s leaf element (Z) 538. In general, for a response that contains an array of values of (R) 532, each value will be output as a row in the table 500.

Figure 6B:
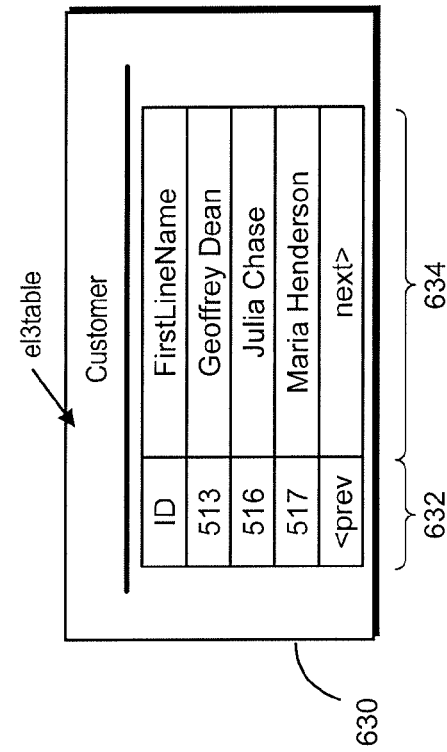
FIGS. 6A and 6B illustrate an exemplar query input and query output, respectively, in accordance with implementations of the present disclosure.
Figure 6A:
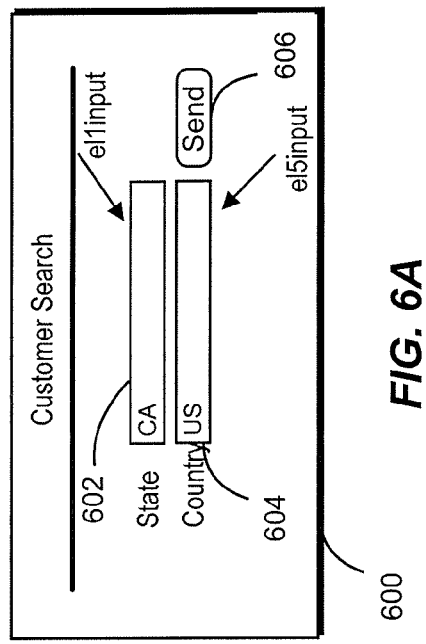

FIGS. 6A and 6B respectively illustrate an exemplar query input and query output in accordance with implementations of the present disclosure. Referring to FIG. 6A, a screen shot 600 of an exemplar input application is depicted. The screen shot 600 includes an "el1input" input field 602 and an "el5input" input field 604. In this example, input field 602 is used to input a State while input field 604 is used to input a Country.

At some point, a user entered contents into fields 602 and 604 and selected a send button 606. When the send button 606 is selected in the input screen 600, the user-entered input 602 and 604 will trigger an operation such as "CustomerSimpleByNameAndAddressQueryResponse_In" defined in a Web Service Description Language (WSDL) file. The WSDL file provides a model for describing particular web services. For example, the WSDL file includes input parameters, output parameters, and data types that define included operations. In a specific example, the "CustomerSimpleByNameAndAddressQueryResponse_In" operation may include an input parameter such as a "CustomerSimpleByNameAndAddressQuery_sync" parameter which is of type "CustomerSimpleByNameAndAddressQueryMessage_sync." The operation may also include an output parameter such as a "CustomerSimpleByNameAndAddressResponse_sync" parameter, which is of type "CustomerSimpleByName AndAddressResponseMessage_sync." Using the above parameters, the WSDL file provides guidance as to which inputs and outputs should match particular input fields. For example, the input field "el1input" 602 may be required to match a specific country code of an input parameter such as "CustomerSimpleByNameAndAddressQuery_sync.CustomerSimpleSelectionByNameA ndAddress.CustomerAddressCountryCode." Similarly, the input field "el5input" 604 may be required to match the region code of an input parameter such as "CustomerSimpleByNameAndAddressQuery_sync.CustomerSimpleSelectionByNameA ndAddress.CustomerAddressRegionCode.#simpleContent."

Referring to FIG. 6B, an exemplar output screen shot 630 is depicted. The output screen shot 630 that contains a table "el3table." The "el3table" includes a first column 632 and a second column 634. The first column 632 matches a customer ID of an output "CustomerSimpleByNameAndAddressResponse_sync.Customer.ID. #simpleContent." The second column 634 matches a FirstLineName of a common name of the customer of an output parameter "CustomerSimpleByNameAndAddress Response_sync.Customer.BasicData.Common. Name.FirstLineName." Similar to the parameters described in FIG. 6A, the above parameters can be found in a WSDL file in a hierarchy structure, for example.

As described above, the structure for matching input fields and input parameters of the web service operation and the matching between output files and output parameters of the operation is stored in the structured matching configuration file 210, for example. The following example input and output data reflects the input and output matching used for the sample applications depicted in FIGS. 6A and 6B.

Input Matching
values[\".CustomerSimpleByNameAndAddressQuery_sync.CustomerSimpleS electionByNameAndAddress.CustomerAdderssRegionCode.#simpleContent\"]=el1input;
values[\".CustomerSimpleByNameAndAddressQuery_sync.CustomerSimpleS electionByNameAndAddress.CustomerAddressCountryCode\"]=el5input
Output Matching
{type:"TableHTML",data:{id:"el3table", . . . , data:".CustomerSimpleByNameA ndAddressResponse_sync.Customer", {id:"col0",name:"ID",data:".ID.#simpleContent", . . . }, {id:"col1",name:"FirstLineName",data:".BasicData.Common.N ame.FirstLineName", . . . }}}

Other information may also be stored and retrieved to deliver web services. Particularly, at runtime, a user triggers a query by clicking the send button 606, for example. The message sent to a server side may pertain to user entered data. For example, the parameter ".CustomerSimpleByNameAndAddressQuery_sync.Customer SimpleSelectionByNameAndAddress.CustomerAddressCountryCode may provide a match if the "US" input is received in the input field 604. Similarly, the parameter ".CustomerSimpleByNameAndAddressQuery_sync.CustomerSimpleSelectionByNameA ndAddress.CustomerAddressRegionCode.#simpleContent" may provide a match if the "CA" input is received in the input field 602. For example, the system can determine that the input value "US" maps to the country code of the input parameter and the input value "CA" maps to the region code of the input parameter.

Codes which define particular operations can also be stored and retrieved. For example, in the above example, a sample text file may include the above parameters and codes such as "confide", "323963561103156", "sId", and "d6cfe405-26f7-4313-9c71-fdf09cd5704a." Specifically, the "Customer- SimpleByNameAndAddressQuery Response_In" operation may be defined as the code "323963561103156." The operation name "CustomerSimpleByNameAndAddressQueryResponse_In" may be stored in another configuration file that is named by the code, rather than the name.

When the server side receives the above invocation, the server can trigger the "CustomerSimpleByNameAndAddressQuery Response_In" operation and can receive a response. The response is typically converted to the text message contained in another system file. The results for this particular example may be represented by the following description: "{'cutAt':null,'CustomerSimpleByNameAndAddress Response_sync': {'Customer': {'ID':['513','516', '517'], 'FirstLineName':['Geoffrey Dean', 'Julia Chase', 'Maria Henderson']}}}". As shown in FIG. 1B, columns 632 and 634 can be constructed using the information in the above description.

Figure 7:
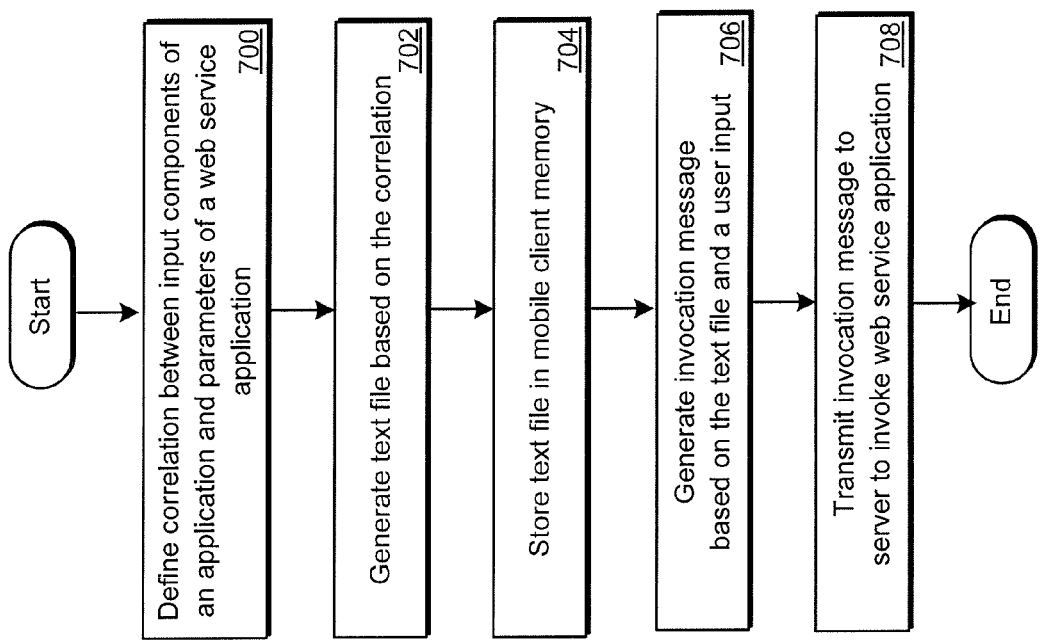
FIG. 7 is a flowchart illustrating exemplar steps that can be executed in accordance with implementations of the present disclosure.

FIG. 7 is a flowchart illustrating exemplar steps that can be executed in accordance with implementations of the present disclosure. In particular, the steps can invoke web services on one or more mobile client devices. The process shown in FIG. 7 may be implemented using software instructions stored in a computer-readable storage medium and executed by a processing system including one or more processing apparatus. The process can, for example, be performed in the environment 100, the design-time environment 200, the run time architecture 300, and/or a distributed client/server system.

In step 700, a correlation between a plurality of input components of an application executed on a mobile client and a plurality of parameters of a web service application is defined. In step 702, a text file based on the correlation is generated. In step 704, the text file is stored in memory of the mobile client. In step 706, an invocation message at the mobile client based on the text file and a user input is generated. In step 708, the invocation message is transmitted to a server to invoke the web service application.

Figure 8:
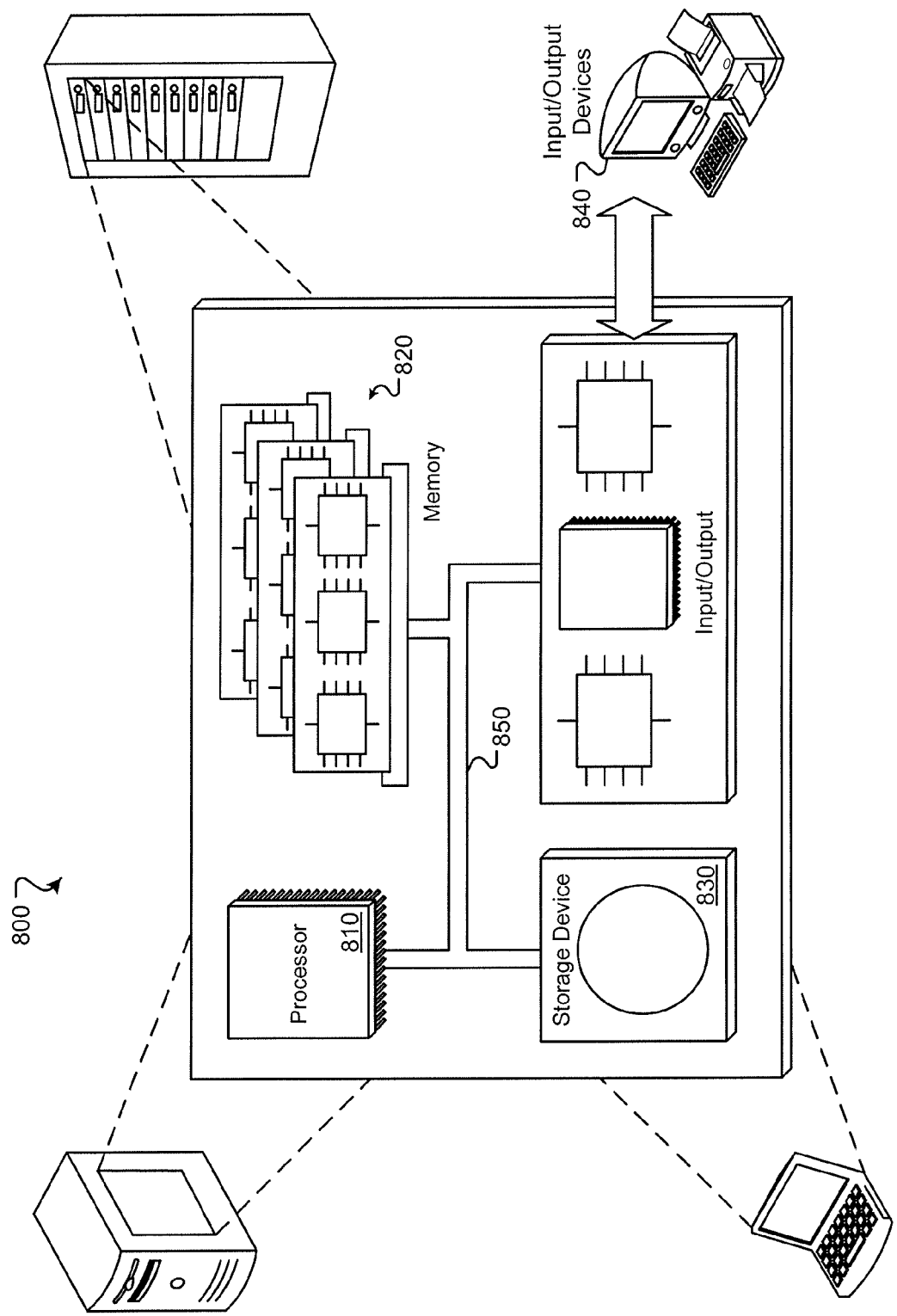
FIG. 8 is a schematic illustration of exemplar computer systems that can be used to execute implementations of the present disclosure.

Referring now to FIG. 8, a schematic diagram of an exemplar computer system 800 is provided. The system 800 can be used for the operations described in association with the method described in FIG. 7 according to one implementation. For example, the system 800 may be included in any or all of the server 30, the mobile client 20, the client 206, or the server 208. The system 800 includes a processor 810, a memory 820, a storage device 830, and an input/output device 840. Each of the components 810, 820, 830, and 840 are interconnected using a system bus 880. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of invoking a web service using a mobile client, comprising:
   generating a structured matching configuration (SMC) file based on a user input that is received during design time of an application and defining an input matching comprising correlation between a plurality of input components of the application and a plurality of parameters of a web service application and an output matching comprising correlation between a plurality of responses of the web service application and output components of the application, the application being executable on the mobile client;
   storing the SMC file in memory of the mobile client, the SMC file mapping input components of the application executed on the mobile client to the plurality of parameters of the web service application that is executed on a server, at least one input value of an input component of the application not directly correlating to a corresponding parameter of the web service application,
   generating an invocation message by using a matching parser to process the user input based on the least one input value corresponding to an input field associated to a known parameter of the plurality of parameters of the web service application and a known operation of the web service application, and to access the SMC file to remove at least a part of the user input; and
   transmitting the invocation message to the server to invoke the web service application, the invocation message being converted to a protocol message on the server without accessing web service invocation codes, the protocol message being used to invoke the web service application.

2. The computer-implemented method of claim 1, further comprising:
   receiving a response message from the server at the mobile client; and
   generating an output to a user at the mobile client based on the response message and the SMC file.

3. The computer-implemented method of claim 1, further comprising:
   storing the SMC file in memory of the server;
   receiving the invocation message at the server; and
   generating the protocol message at the server based on the invocation message and the SMC file.

4. The computer-implemented method of claim 1, further comprising:
   storing the SMC file in memory of the server;
   receiving a response protocol message at the server, the response protocol message having been generated by the web service application;
   generating a response message at the server based on the response protocol message and the SMC file; and
   transmitting the response message to the mobile client.

5. The computer-implemented method of claim 1, further comprising:
   executing a parser on the mobile client; and
   processing the user input using the parser, the parser accessing the SMC file and generating the invocation message.

6. The computer-implemented method of claim 1, further comprising:
   storing the SMC file in memory of the server;
   executing a parser on the server; and
   processing the invocation message using the parser, the parser accessing the SMC file and generating the protocol message to invoke the web service application.

7. The computer-implemented method of claim 1, further comprising:
   modifying the correlation between the plurality of input components and the plurality of parameters;
   generating a revised SMC file based on the correlation; and
   storing the revised SMC file in memory of the mobile client, wherein a subsequent invocation message is generated at the mobile client based on the revised SMC file and a user input.

8. A non-transitory computer-readable storage medium coupled to one or more processors and having instructions stored thereon which, when executed by the one or more processors, cause the one or more processors to perform operations of invoking a web service using a mobile client comprising:
   generating a structured matching configuration (SMC) file based on a user input that is received during design time of an application and defining an input matching comprising correlation between a plurality of input components of the application and a plurality of parameters of a web service application and an output matching comprising correlation between a plurality of responses of the web service application and output components of the application, the application being executable on the mobile client;
   storing the SMC file in memory of the mobile client, the SMC file mapping input components of the application executed on the mobile client to the plurality of parameters of the web service application that is executed on a server, at least one input value of an input component of the application not directly correlating to a corresponding parameter of the web service application,
   generating an invocation message by using a matching parser to process the user input based on the least one input value corresponding to an input field associated to a known parameter of the plurality of parameters of the web service application and a known operation of the web service application, and to access the SMC file to remove at least a part of the user input; and
   transmitting the invocation message to the server to invoke the web service application, the invocation message being converted to a protocol message on the server without accessing web service invocation codes, the protocol message being used to invoke the web service application.

9. The non-transitory storage medium of claim 8, wherein the operations further comprise:
   receiving a response message from the server at the mobile client; and
   generating an output to a user at the mobile client based on the response message and the SMC file.

10. The non-transitory storage medium of claim 8, wherein the operations further comprise:
storing the SMC file in memory of the server;
receiving the invocation message at the server; and
generating the protocol message at the server based on the invocation message and the SMC file.

11. The non-transitory storage medium of claim 8, wherein the operations further comprise:
storing the SMC file in memory of the server;
receiving a response protocol message at the server, the response protocol message having been generated by the web service application;
generating a response message at the server based on the response protocol message and the SMC file; and
transmitting the response message to the mobile client.

12. The non-transitory storage medium of claim 8, wherein the operations further comprise:
executing a parser on the mobile client; and
processing the user input using the parser, the parser accessing the SMC file and generating the invocation message.

13. The non-transitory storage medium of claim 8, wherein the operations further comprise:
storing the SMC file in memory of the server;
executing a parser on the server; and
processing the invocation message using the parser, the parser accessing the SMC file and generating the protocol message to invoke the web service application.

14. The non-transitory storage medium of claim 8, wherein the operations further comprise:
modifying the correlation between the plurality of input components and the plurality of parameters;
generating a revised SMC file based on the correlation; and
storing the revised SMC file in memory of the mobile client, wherein a subsequent invocation message is generated at the mobile client based on the revised SMC file and a user input.

15. A system, comprising:
a server that is operable to invoke web services based on received invocation messages; and
a mobile client that is operable to execute an application having a plurality of input components, and that is operable to:
store a structured matching configuration (SMC) file in memory of the mobile client, the SMC file having been generated based on a user input that is received during design time of an application and defining an input matching comprising correlation between a plurality of input components of the application and a plurality of parameters of a web service application and an output matching comprising correlation between a plurality of responses of the web service application and output components of the application, the application being executable on the mobile client, the SMC file mapping input components of the application executed on the mobile client to the plurality of parameters of the web service application that is executed on a server, at least one input value of an input component of the application not directly correlating to a corresponding parameter of the web service application, the SMC file being generated based on user input that is received during an application design time and that defines a correlation between the plurality of input components of the application and the plurality of parameters of the web service application;
generate an invocation message by using a matching parser to process the user input based on the least one input value corresponding to an input field associated to a known parameter of the plurality of parameters of the web service application and a known operation of the web service application, and to access the SMC file to remove at least a part of the user input; and
transmit the invocation message to the server to invoke the web service application, the invocation message being converted to a protocol message on the server without accessing web service invocation codes, the protocol message being used to invoke the web service application.

16. The system of claim 15, wherein the mobile client is further operable to:
receive a response message from the server; and
generate an output to a user based on the response message and the SMC file.

17. The system of claim 15, wherein the server is further operable to:
store the SMC file in memory;
receive the invocation message; and
generate the protocol message based on the invocation message and the SMC file.

18. The system of claim 15, wherein the server is further operable to:
store the SMC file in memory;
receive a response protocol message, the response protocol message having been generated by the web service application;
generate a response message based on the response protocol message and the SMC file; and
transmit the response message to the mobile client.

19. The system of claim 15, wherein the mobile client is further operable to:
execute a parser on the mobile client; and
process the user input using the parser, the parser accessing the SMC file and generating the invocation message.

20. The system of claim 15, wherein the server is further operable to:
store the SMC file in memory;
execute a parser on the server; and
process the invocation message using the parser, the parser accessing the SMC file and generating the protocol message to invoke the web service application.

21. The system of claim 15, wherein the correlation between the plurality of input components and the plurality of parameters is modified, a revised SMC file is generated based on the correlation, the revised SMC file is stored in memory of the mobile client, and a subsequent invocation message is generated at the mobile client based on the revised SMC file and a user input.

* * * * *